United States Patent [19]

Hoover et al.

[11] 4,242,513
[45] Dec. 30, 1980

[54] LACTONE COMPOUNDS CONTAINING A HETEROCYCLIC RADICAL

[75] Inventors: Troy E. Hoover; Sheldon Farber; William J. Becker, all of Appleton, Wis.

[73] Assignee: Appleton Papers Inc., Appleton, Wis.

[21] Appl. No.: 17,765

[22] Filed: Mar. 5, 1979

[51] Int. Cl.$^3$ .......................................... C07D 491/048
[52] U.S. Cl. .................... 544/345; 282/27.5; 544/117; 544/126; 544/127; 544/135; 544/139; 544/281; 544/347; 544/350; 546/84; 546/121; 548/150; 548/154; 548/324
[58] Field of Search ................ 282/27.5; 260/304 D, 260/306.8 F; 544/117, 126, 127, 135, 139, 281, 345, 347, 350; 546/84, 121; 548/324, 150, 154

[56] References Cited

U.S. PATENT DOCUMENTS

| | | | |
|---|---|---|---|
| 3,916,070 | 10/1975 | Ozutsumi et al. | 282/27.5 |
| 4,020,068 | 4/1977 | Farber | 282/27.5 |
| 4,100,169 | 7/1978 | Petitpierre | 282/27.5 |

*Primary Examiner*—Paul M. Coughlan, Jr.

*Attorney, Agent, or Firm*—E. Frank McKinney; Paul S. Phillips, Jr.

[57] ABSTRACT

Chromogenic compounds of normally colorless form are disclosed having the following structural formula:

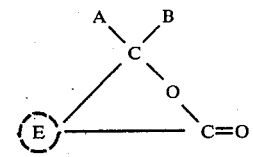

wherein E represents a six-membered aromatic or heterocyclic ring which may have an aromatic condensed ring and both the E ring and the condensed ring may be substituted, A represents an optionally substituted aminophenyl, indolyl, benzoindolyl, julolidinyl or kairolyl radical or the radical represented by B, and B represents a family of heterocyclic radicals. The compounds of this invention are eligible for use in pressure-sensitive and heat sensitive record materials and manifold marking systems.

21 Claims, No Drawings

LACTONE COMPOUNDS CONTAINING A HETEROCYCLIC RADICAL

Technical Field

This invention pertains to novel chromogenic compounds which can give intense colors when they are contacted with an electron accepting co-reactant. More specifically, this invention relates to chromogenic compounds eligible for use in pressure-sensitive or heat-sensitive mark-forming record systems. Such systems are improved by use of these compounds. As used in mark-forming systems, marking in desired areas on support webs or sheets may be accomplished by effecting localized reactive contact between the chromogenic material and the electron accepting material on or in such a web or sheet, such material being brought thereto by transfer, or originally there in situ, the desired reactive contact forming colored images in the intended image-marking areas.

The chromogenic compounds of this invention are represented by a material selected from the group consisting of:

(a) a compound represented by the formula:

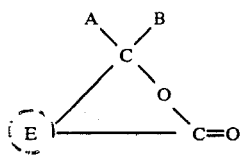

(I)

wherein
A is:

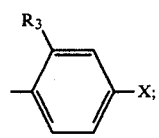

X is:

and morpholino;
$R_1$ and $R_2$ are: hydrogen, alkyl and aryl;
$R_3$ is: hydrogen and alkoxy;
E is:

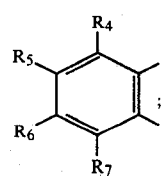

$R_4$, $R_5$, $R_6$ and $R_7$ are: hydrogen, halogen, and dialkylamino;
B is:
Y;

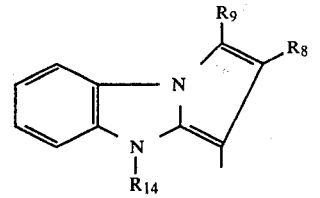

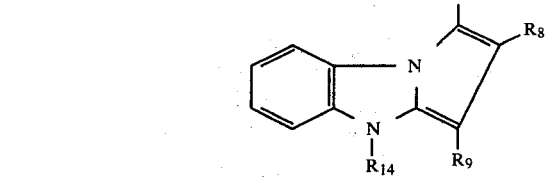

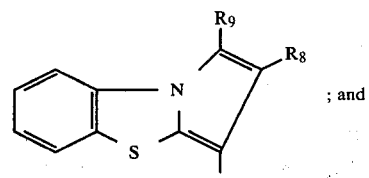

; and

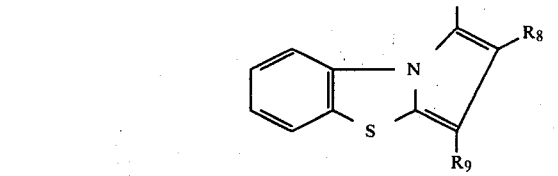

Y is:

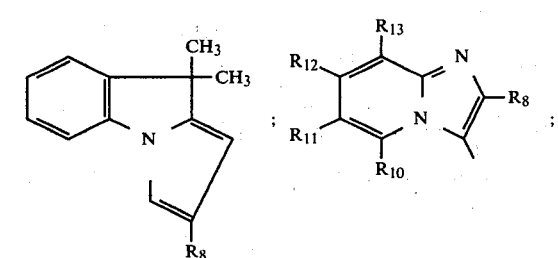

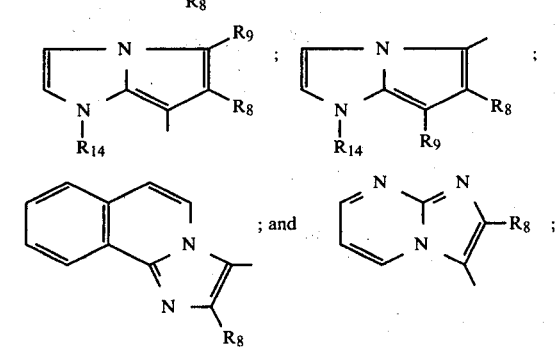

$R_8$ is aryl, substituted aryl and alkyl;
$R_9$ is hydrogen, alkyl and aryl;
$R_{10}$, $R_{11}$, $R_{12}$ and $R_{13}$ are hydrogen, alkyl and nitro; and
$R_{14}$ is hydrogen and alkyl;

(b) a compound represented by the formula (I) wherein A is:

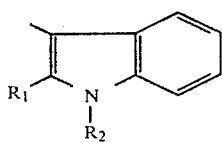
E is:
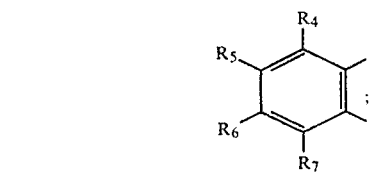
B is:
Y;
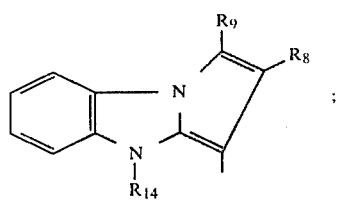
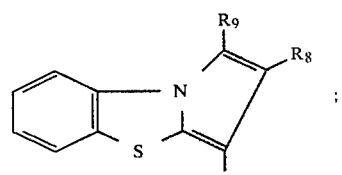
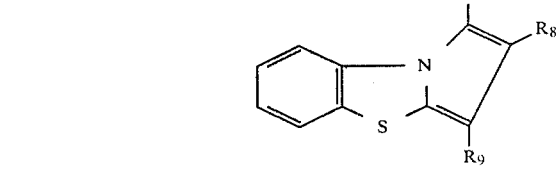
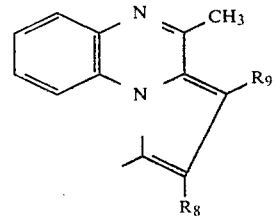
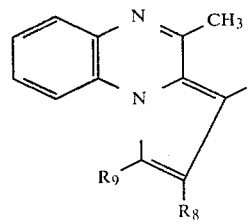
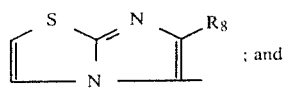
; and
$R_1$ through $R_{14}$ and Y are as previously defined;
(c) a compound represented by the formula (I) wherein A is:
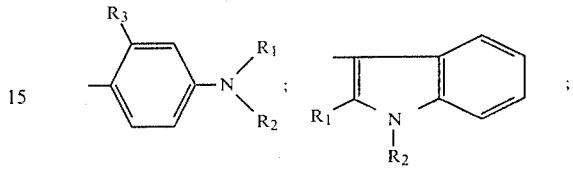
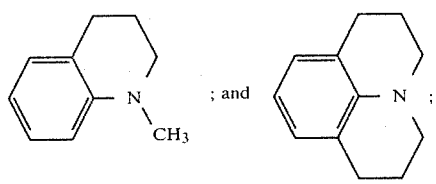
E is:
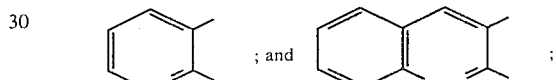
; and
B is:
Y;
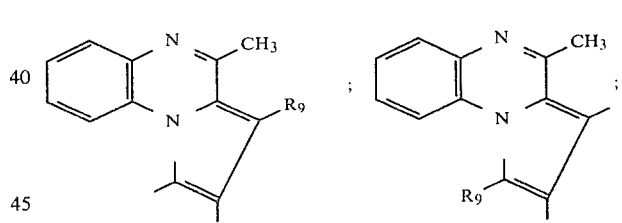
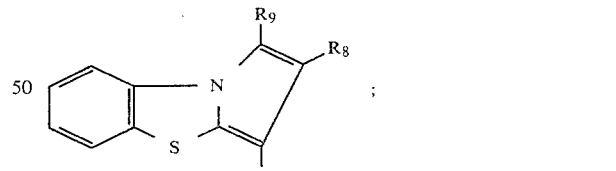
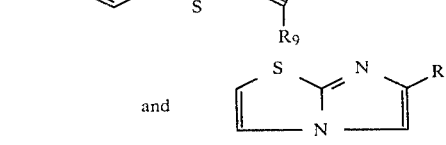
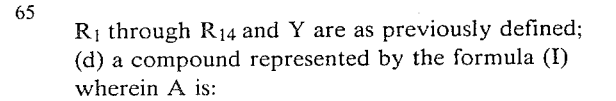
and ; and
$R_1$ through $R_{14}$ and Y are as previously defined;
(d) a compound represented by the formula (I) wherein A is:

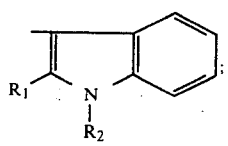

E is:

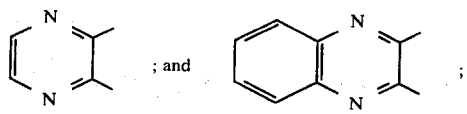

B is:
Y;

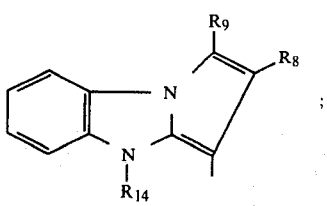

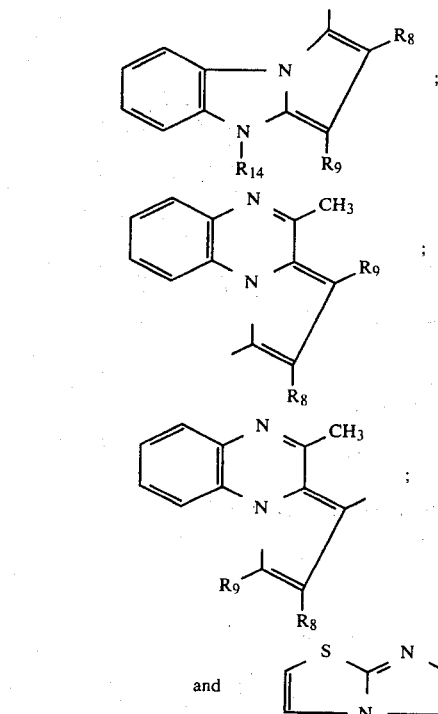

and 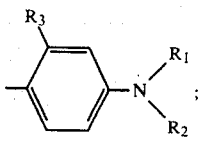 ; and $R_1$ through $R_{14}$ and Y are as previously defined; and
(e) a compound represented by the formula (I)
wherein A is:

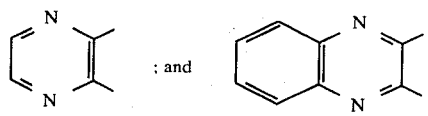

B is:
Y;

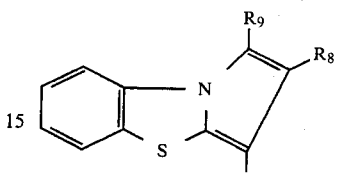

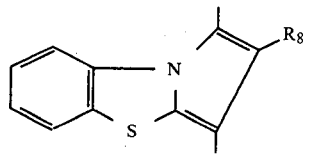

and 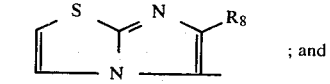 ; and $R_1$ through $R_{14}$ and Y are as previously defined.

Background Art

Several different types of chromogenic lactone compounds are described in U.S. Pat. No. Re. 23,024, U.S. Pat. Nos. 3,491,112, 3,491,116, 3,509,173, 3,540,909, 3,540,911, 3,540,912, 3,736,337, 3,755,424, 3,853,869 and 4,020,068 and in Belgian Pat. No. 844,962.

Chemical Abstracts, Vol. 66, 105869f, 1967, discloses azo dyes containing heterocyclic radicals. Chemical Abstracts, Vol. 69, 60031v, 1968, discloses cyanine dyes containing heterocyclic radicals.

Disclosure of the Invention

Colorable novel chromogenic lactone compounds having certain heterocyclic radicals have been discovered. These compounds are initially substantially colorless but produce colored products on reaction with certain acid materials. It is an object of this invention to provide compounds containing such heterocyclic radicals, methods for making them and mark-forming record systems containing them.

It is another object of this invention to provide heterocyclic radical-containing compounds which produce substantially the same color of mark with different types of acid reactants.

It is yet another object to provide such compounds which produce colored marks which are resistant to actinic radiation.

Preferred among the compounds of this invention are represented by the formula:

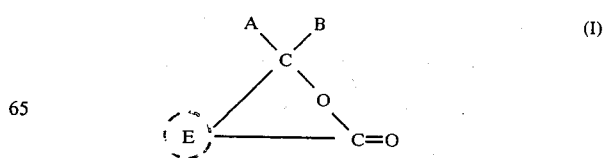

wherein A is:

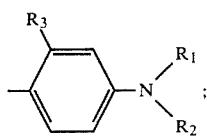
E is:
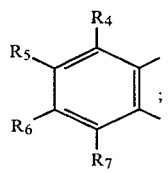
and
B is:
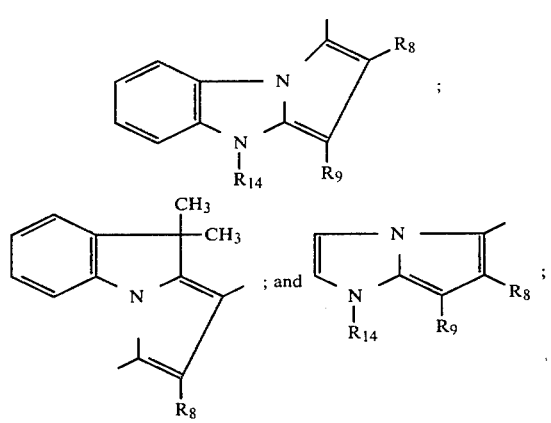
are represented by the formula (I):
wherein A is:
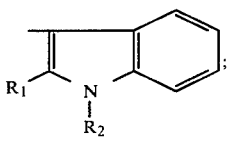
E is:
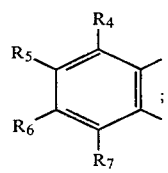
and
B is:
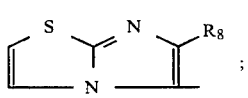
are represented by the formula (I):
wherein A is:
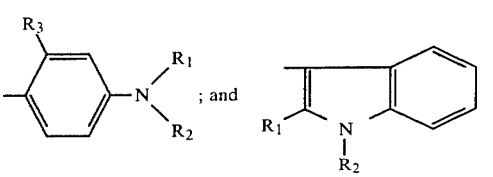
E is:
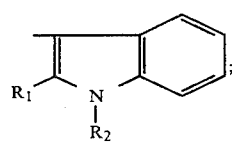
and
B is:
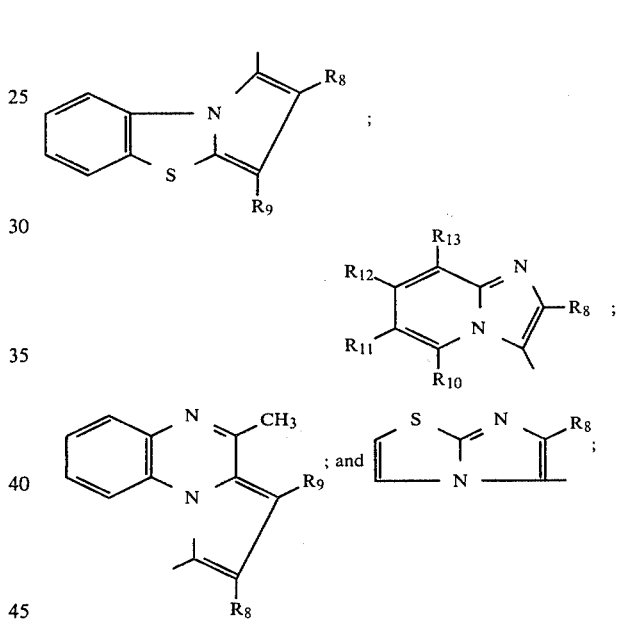
are represented by the formula (I):
wherein A is:
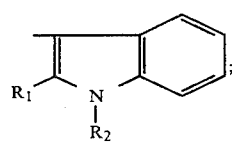
E is:
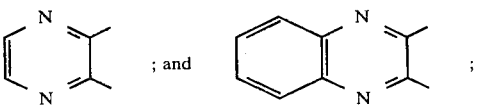
and
B is:

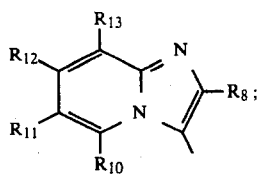

and
are represented by the formula (I):
wherein A is:

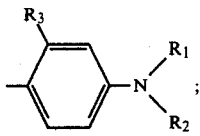

E is:

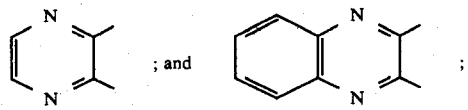

B is:

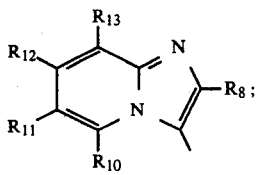

and
$R_1$ through $R_{14}$ are as previously defined.

More preferred among the compounds of this invention are represented by the formula:

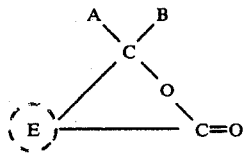

wherein A is:

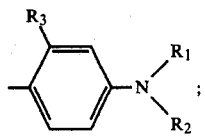

E is:

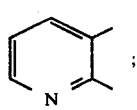

B is:

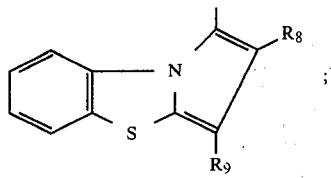

and
$R_1$, $R_2$, $R_3$, $R_8$ and $R_9$ are as previously defined.

BEST MODE FOR CARRYING OUT THE INVENTION

The chromogenic compounds of this invention are eligible for use in pressure-sensitive and thermally-sensitive mark-forming systems. Pressure-sensitive mark-forming systems provide a marking system of disposing on and/or within sheet support material unreacted mark-forming components and a liquid solvent in which one or both of the mark-forming components is soluble, said liquid solvent being present in such form that it is maintained isolated by a pressure-rupturable barrier from at least one of the mark-forming components until application of pressure causes a breach of the barrier in the area delineated by the pressure pattern. The mark-forming components are thereby brought into reaction contact, producing a distinctive mark.

The pressure-rupturable barrier, which maintains the mark-forming components in isolation preferably comprises microcapsules containing liquid solvent solution. The microencapsulation process utilized can be chosen from the many known in the art. Well known methods are disclosed in U.S. Pat. Nos. 2,800,457, 3,041,289, 3,533,958, 3,755,190, 4,001,140 and 4,100,103. Any of these and other methods are suitable for encapsulating the liquid solvent containing the chromogenic compounds of this invention.

The method of marking comprises providing a chromogenic compound of the present invention and bringing such chromogenic compound into reactive contact, in areas where marking is desired, with an acidic color-activating substance to produce a colored form of the chromogenic compound.

The acidic material can be any compound within the definition of a Lewis acid, i.e. an electron acceptor. These materials include clay substances such as attapulgite, bentonite and montmorillonite and treated clays such as silton clay as disclosed in U.S. Pat. Nos. 3,622,364 and 3,753,761, materials such as silica gel, talc, feldspar, magnesium trisilicate, pyrophyllite, zinc sulfate, zinc sulfide, calcium sulfate, calcium citrate, calcium phosphate, calcium fluoride and barium sulfate, aromatic carboxylic acids such as salicyclic acid, derivatives of aromatic carboxylic acids and metal salts thereof as disclosed in U.S. Pat. No. 4,022,936 and acidic polymeric material such as phenol-formaldehyde polymers, phenol-acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinyl methyl ether maleic anhydride copolymers and mixtures thereof as disclosed in U.S. Pat. No. 3,672,935.

Record sheet material coated with metal-modified phenolic resins is disclosed in U.S. Pat. No. 732,120. An example of the compositions which can be coated onto the surface of a sheet to react with the chromogenic compounds of this invention is as follows:

| Coating Composition | Percent by Weight |
|---|---|
| Zinc-modified phenolic polymer | 13.6 |
| Paper coating kaolin | 67.9 |
| Calcium carbonate | 6.0 |
| Styrene-butadiene latex | 6.0 |
| Etherified corn starch | 6.5 |

The following examples are given merely as illustrative of the present invention and are not to be considered as limiting.

The intermediates required for the preparation of the novel chromogenic compounds of this invention are classes of compounds readily obtained by procedures well known in the prior art.

The intermediates, substrate reactant B, which result in the heterocyclic radical portion of the novel chromogenic compounds can be made by procedures analogous to those in one or more of the following references:

1. T. Uchida and K. Matsumoto, Synthesis, 209(1976) and references therein.
2. N. P. Buu-Hoi et al., J. Org. Chem. 19, 1370(1954).
3. J. Fisher and J. Straley, British Pat. No. 1,159,691.
4. N. P. Buu-Hoi, Nguyen-Dat-Xuong and Ta-Thu-Cuc, Bull. Soc. Chim. France, 1277 (1966).
5. R. M. Palei and P. M. Kochergin, Khim. Geterotsikl. Soed. 536(1967).
6. F. Kroehnke and W. Zecher, Ber. 95, 1128(1962).
7. A. Druyhinina, P. Kochergin and N. Bychkove, Khim. Geterotshikl Soed., 856(1969).
8. F. Kroehnke and W. Friedrich, Ber. 96, 1195(1963).
9. G. W. H. Cheeseman and B. Tuck, J. Chem. Soc. 3678(1965).

The other reactant, the keto acid, required for the preparation of the novel chromogenic compounds of this invention is disclosed in U.S. Pat. Nos. 3,491,111, 3,491,112, 3,491,116, 3,509,173, 3,775,424, 3,936,564, 4,020,068 and 4,022,771 and in Belgian Pat. No. 844,962.

Unless otherwise noted, the percentages throughout the application are by weight.

EXAMPLE 1

Preparation of 3-(1-ethyl-2-methylindol-3-yl)-3-(6-p-methoxyphenylimidazo[2,1-b]thiazol-5-yl)phthalide.

A solution of 1.23 grams of 6-p-methoxyphenylimidazo[2,1-b]thiazole and 0.92 gram of (1-ethyl-2-methylindol-3-yl)(2-carboxyphenyl)-ketone in 30 ml. of acetic anhydride was stirred for three hours at 50°–55° C. The reaction mixture was poured into 300 ml. of water and the pH adjusted to 9.8 with ammonium hydroxide. The solid was filtered and washed with water yielding 2.1 grams of product with a melting point of 115°–120° C. A chloroform solution of the product applied to record sheet material comprising silton clay produced a purple color.

Additional experiments were performed where a keto acid and a substrate reactant B were mixed with acetic anhydride and heated. The reaction mixture was cooled, treated with dilute ammonium hydroxide and extracted with toluene. In Table I is a listing of the reactant pairs and the respective color produced when the toluene extract of the reaction product was applied to a record sheet material coated with silton clay.

TABLE I

| Keto Acid | Substrate Reactant B | Color Produced |
|---|---|---|
| (1-ethyl-2-methylindol-3-yl)(2-carboxyphenyl)-ketone | 4-ethyl-2-phenyl-4H-pyrrolo[1,2-a]benzimidazole | Purple |
| (1-ethyl-2-methylindol-3-yl)(2-carboxyphenyl)-ketone | 8-methyl-2-phenylimidazo[1,2-a]pyridine | Purple |
| (1-ethyl-2-methylindol-3-yl)(2-carboxyphenyl)-ketone | 6-phenylimidazo[1,2-b]thiazole | Purple |
| 1-ethyl-2-methylindol-3-yl)(2-carboxyphenyl)-ketone | 2-(p-methoxyphenyl)imidazo[1,2-a]pyridine | Purple |
| (1-ethyl-2-methylindol-3-yl)(2-carboxyphenyl)-ketone | 2-phenylimidazo[1,2-a]pyridine | Red |
| (1-ethyl-2-methylindol-3-yl)(2-carboxyphenyl)-ketone | 2-phenyl pyrrolo[2,1-b]benzothiazole | Green |
| (1-ethyl-2-methylindol-3-yl)-(2-carboxy-3,4,5,6-tetrachlorophenyl)ketone | 4-ethyl-2-phenyl-4H-pyrrolo[1,2-a]benzimidazole | Red |
| (1-ethyl-2-methylindol-3-yl)-(2-carboxy-3,4,5,6-tetrachlorophenyl)ketone | 2-(p-methoxyphenyl)imidazo[1,2-a]pyridine | Red |
| (1-ethyl-2-methylindol-3-yl)-(2-carboxy-3,4,5,6-tetrachlorophenyl)ketone | 2-phenylimidazo[1,2-a]pyridine | Red |
| (1-ethyl-2-methylindol-3-yl)-(2-carboxy-3,4,5,6-tetrachlorophenyl)ketone | 6-(p-methoxyphenyl)imidazo[2,1-b]thiazole | Red |
| (1-ethyl-2-methylindol-3-yl)-(2-carboxy-3,4,5,6-tetrachlorophenyl)ketone | 2-phenylpyrrolo[2,1-b]benzothiazole | Green |

EXAMPLE 2

Preparation of 3-(4-diethylamino-2-ethoxyphenyl)-3-(2-(p-dimethylaminophenyl)imidazo[1,2-a]pyridine.

A mixture of 0.35 gram of 2-(p-dimethylaminophenyl)imidazo[1,2-a]pyridine, 0.47 gram of 2-methoxy-4-diethylamino-2'-carboxybenzophenone and 6 ml. of acetic anhydride was heated at 50° C. for 2 hours with stirring. The reaction mixture was allowed to stand overnight and the following day was poured into 100 ml. of water. The pH of the mixture was adjusted to 9.8 with ammonium hydroxide. A benzene extraction of the mixture was evaporated under reduced pressure to yield 0.78 gram of product which showed a strong lactone carbonyl infrared spectrum peak at 1755 cm$^1$. An ether extract of the product was chromatographed on a microalumina column. A chloroform solution of this purified product yielded a blue color when applied to a record sheet material coated with silton clay.

EXAMPLES 3–8

According to substantially the same procedure as described in example 2, a keto acid was reacted with a substantially equimolar amount of a substrate reactant B in the presence of acetic anhydride with heating. The solid product was separated and recrystallized to a constant melting point. A solution of this product in chloroform was used to produce a color on a record sheet material coated with a zinc-modified phenolic resin or silton clay or on silica gel. These reactants and the results are listed in Table II.

Additional experiments were performed where a keto acid and a substrate reactant B were mixed with acetic anhydride and heated. The reaction mixture was cooled, treated with dilute ammonium hydroxide and extracted with toluene. In Table III is a listing of the reactant pairs and the respective color produced when the toluene extract of the reaction product was applied to a record sheet material coated with a zinc-modified phenolic resin or silton clay or to silica gel.

TABLE II

| Example | Keto Acid | Substrate Reactant B | Yield | Melting Point | Color | Acid Reactant |
|---|---|---|---|---|---|---|
| 3 | 2-ethoxy-4-diethylamino-2'-carboxybenzophenone | 8-methyl-2-phenylimidazo-[1,2-a]pyridine | 96% | 105–110° C. | Blue | Silica Gel |
| 4 | 2-ethoxy-4-diethylamino-2'-carboxybenzophenone | 6-p-methoxyphenylimidazo-[2,1-b]thiazole | 38% | 110–115° C. | Purple | Silton Clay |
| 5 | 2-ethoxy-4-diethylamino-2'-carboxybenzophenone | 4-ethyl-1-methyl-2-phenyl-4H-pyrrolo[1,2-a]benzimidazole | 60% | 153–155° C. | Blue | zinc-modified phenolic resin |
| 6 | 2-ethoxy-4-diethylamino-2'-carboxybenzophenone | 4-ethyl-2-phenyl-4H-pyrrolo-[1,2-a]benzimidazole | 95% | 113–116° C. | Blue | zinc-modified phenolic resin |
| 7 | 4-diethylamino-2'-carboxybenzophenone | 2-phenyl-9,9-dimethyl-9H-pyrrolo[1,2-a]indole | | 263–264° C. | Blue | zinc-modified phenolic resin |
| 8 | 2-ethoxy-4-diethylamino-2'-carboxybenzophenone | 1-ethyl-6-phenyl-1H-pyrrolo-[1,2-a]imidazole | 31% | 166–168° C. | Blue | zinc-modified phenolic resin |

TABLE III

| Keto Acid | Substrate Reactant B | Color | Acid Reactant |
|---|---|---|---|
| 4'-diethylamino-2-carboxybenzophenone | 4-ethyl-2-phenyl-4H-pyrrolo[1,2-a]-benzimidazole | Blue | zinc-modified phenolic resin |
| 4'-diethylamino-2-carboxybenzophenone | 1-methyl-2-phenyl-4-ethyl-4H-pyrrolo[1,2-a]benzimidazole | Blue | zinc-modified phenolic resin |
| 4'-diethylamino-2-carboxybenzophenone | 8-methyl-2-phenylimidazo[1,2-a]-pyridine | Blue | Silica Gel |
| 4'-diethylamino-2-carboxybenzophenone | 6-phenylimidazo[2,1-b]thiazole | Blue | Silica Gel |
| 4'-diethylamino-2-carboxybenzophenone | 2-(p-methoxyphenyl)imidazo-[1,2-a]pyridine | Blue | Silica Gel |
| 4'-diethylamino-2-carboxy-3,4,5,6-tetrachlorobenzophenone | 4-ethyl-2-phenyl-4H-pyrrolo[1,2-a]benzimidazole | Green | zinc-modified phenolic resin |
| 4'-diethylamino-2-carboxy-3,4,5,6-tetrachlorobenzophenone | 2-phenyl-9,9-dimethyl-9H-pyrrolo-[1,2-a]indole | Blue | Silica Gel |
| 4'-diethylamino-2-carboxy-3,4,5,6-tetrachlorobenzophenone | 1-methyl-2-phenyl-4-ethyl-4H-pyrrolo[1,2-a]benzimidazole | Blue | zinc-modified phenolic resin |
| 4'-diethylamino-2-carboxy-3,4,5,6-tetrachlorobenzophenone | 8-methyl-2-phenylimidazo[1,2-a]-pyridine | Blue | Silica Gel |
| 4'-diethylamino-2-carboxy-3,4,5,6-tetrachlorobenzophenone | 6-phenylimidazo[2,1-b]thiazole | Blue | Silica Gel |
| 4'-diethylamino-2-carboxy-3,4,5,6-tetrachlorobenzophenone | 2-(p-methoxyphenyl)imidazo[1,2-a]-pyridine | Blue | Silica Gel |
| 2-carboxy-4,4'-bis(dimethylamino)-benzophenone | 4-ethyl-2-phenyl-4H-pyrrolo[1,2-a]-benzimidazole | Purple | zinc-modified phenolic resin |
| 2-carboxy-4,4'-bis(dimethylamino)-benzophenone | 2-phenyl-9,9-dimethyl-9H-pyrrolo-[1,2-a]indole | Purple | zinc-modified phenolic resin |
| 2-carboxy-4,4'-bis(dimethylamino)-benzophenone | 1-methyl-2-phenyl-4-ethyl-4H-pyrrolo-[1,2-a]benzimidazole | Purple | zinc-modified phenolic resin |
| 2-carboxy-4,4'-bis(dimethylamino)-benzophenone | 8-methyl-2-phenylimidazo[1,2-a]-pyridine | Blue | zinc-modified phenolic resin |
| 2-carboxy-4,4'-bis(dimethylamino)-benzophenone | 6-phenylimidazo[2,1-b]thiazole | Blue | Silton Clay |
| 2-carboxy-4,4'-bis(dimethylamino)-benzophenone | 2-(p-methoxyphenyl)imidazo[1,2-a]-pyridine | Blue | Silton Clay |
| 2-carboxy-2'-methoxy-4'-methyl-N-p-tolylaminobenzophenone | 4-ethyl-2-phenyl-4H-pyrrolo[1,2-a]-benzimidazole | Blue | zinc-modified phenolic resin |
| 2-carboxy-2'-methoxy-4'-methyl-N-p-tolylaminobenzophenone | 2-phenyl-9,9-dimethyl-9H-pyrrolo-[1,2-a]indole | Purple | zinc-modified phenolic resin |
| 2-carboxy-2'-methoxy-4'-methyl-N-p-tolylaminobenzophenone | 1-methyl-2-phenyl-4-ethyl-4H-pyrrolo-[1,2-a]benzimidazole | Purple | zinc-modified phenolic resin |
| 2-carboxy-3,4,5,6-tetrachloro-2'-methoxy-4'-diethylaminobenzophenone | 4-ethyl-2-phenyl-4H-pyrrolo[1,2-a]-benzimidazole | Green | zinc-modified phenolic resin |
| 2-carboxy-3,4,5,6-tetrachloro-2'-methoxy-4'-diethylaminobenzophenone | 1-methyl-2-phenyl-4-ethyl-4H-pyrrolo-[1,2-a]benzimidazole | Blue | zinc-modified phenolic resin |
| 2-carboxy-2'-methoxy-4'-cyclohexyl-aminobenzophenone | 4-ethyl-2-phenyl-4H-pyrrolo[1,2-a]-benzimidazole | Blue | zinc-modified phenolic resin |
| 2-carboxy-2'-methoxy-4'-cyclohexyl-aminobenzophenone | 2-phenyl-9,9-dimethyl-9H-pyrrol-[1,2-a]indole | Red | zinc-modified phenolic resin |
| 2-carboxy-2'-methoxy-4'-cyclohexyl-aminobenzophenone | 1-methyl-2-phenyl-4-ethyl-4H-pyrrolo-[1,2-a]benzimidazole | Gray | Silton Clay |
| 2-carboxy-2'-n-butoxy-4'-diethyl- | 4-ethyl-2-phenyl-4H-pyrrolo[1,2-a]- | | zinc-modified |

TABLE III-continued

| Keto Acid | Substrate Reactant B | Color Produced Color | Acid Reactant |
|---|---|---|---|
| aminobenzophenone | benzimidazole | Black-Blue | phenolic resin |
| 2-carboxy-2'-n-butoxy-4'-diethyl-aminobenzophenone | 2-phenyl-9,9-dimethyl-9H-pyrrolo-[1,2-a]indole | Purple-Blue | zinc-modified phenolic resin |
| 2-carboxy-2'-n-butoxy-4'-diethyl-aminobenzophenone | 1-methyl-2-phenyl-4-ethyl-4H-pyrrolo-[1,2-a]benzimidazole | Blue | zinc-modified phenolic resin |
| 2-carboxy-4'-morpholinobenzophenone | 4-ethyl-2-phenyl-4H-pyrrolo[1,2-a]-benzimidazole | Purple | zinc-modified phenolic resin |
| 2-carboxy-4'-morpholinobenzophenone | 2-phenyl-9,9-dimethyl-9H-pyrrolo-[1,2-a]indole | Red | zinc-modified phenolic resin |
| 2-carboxy-4'-morpholinobenzophenone | 1-methyl-2-phenyl-4-ethyl-4H-pyrrolo-[1,2-a]benzimidazole | Purple | zinc-modified phenolic resin |
| 2-carboxy-2'-methoxy-4'-diethylamino benzophenone | 4-ethyl-2-phenyl-4H-pyrrolo[1,2-a]-benzimidazole | Blue | zinc-modified phenolic resin |
| 2-carboxy-2'-methoxy-4'-diethylamino-benzophenone | 2-phenyl-9,9-dimethyl-9H-pyrrolo-[1,2-a]indole | Purple | zinc-modified phenolic resin |
| 2-carboxy-2'-methoxy-4'-diethylamino-benzophenone | 1-methyl-2-phenyl-4-ethyl-4H-pyrrolo-[1,2-a]benzimidazole | Blue | zinc-modified phenolic resin |
| 2-carboxy-2'-methoxy-4'-diethylamino-benzophenone | 8-methyl-2-phenylimidazo[1,2-a]-pyridine | Green | silica gel |
| 2-carboxy-2'-methoxy-4'-diethylamino-benzophenone | 6-phenylimidazo[2,1-b]thiazole | Purple | silica gel |
| 2-carboxy-2'-methoxy-4'-diethylamino-benzophenone | 2-(p-methoxyphenyl)imidazo[1,2-a]-pyridine | Blue | silica gel |

In the examples to follow which disclose the preparation of chromogenic compounds of the pyridinone and quinolinone types from the respective pyridinyl and quinolinyl keto acids, each reaction results in a mixture of two position isomers. Unless specifically stated, when the name of one isomer for either the keto acid or the chromogenic compound is given, a mixture of both isomers is understood. For example the keto acid (1-ethyl-2-methylindol-3-yl)(3-carboxypyridin-2-yl)ketone in Example 9 is really a mixture of the named compound and its isomer, (1-ethyl-2-methylindol-3-yl)(2-carboxypyridin-3-yl)ketone. Likewise, the chromogenic compound product in Example 9, 7-(1-ethyl-2-methylindol-3-yl)-7-(6-p-methoxy-phenylimidazo[2,1b]thiazol-5-yl)-5,7-dihydrofuro-[3,4-b]pyridin-5-one is actually a mixture of the named compound and its isomer, 5-(1-ethyl-2-methyl-indol-3-yl)-5-(6-p-methoxyphenylimidazo[2,1-b]thiazol-5-yl)-5,7-dihydrofuro[3,4-b]pyridin-7-one.

EXAMPLE 9

Preparation of 7-(1-ethyl-2-methylindol-3-yl)-7-(6-p-methoxy-phenylimidazo[2,1-b]thiazol-5-yl)-5,7-dihydrofuro[3,4-b]pyridin-5-one.

A mixture of 0.92 gram of 6-p-methoxy phenylimidazo[2,1-b]thiazole, 0.69 gram of (1-ethyl-2-methylindol-3-yl)(3-carboxypyridin-2-yl)ketone and 20 ml. of acetic anhydride was stirred 2.5 hours at 50° C. The reaction solution was poured into 250 ml. of water and adjusted to pH 9.8 with ammonium hydroxide. After one hour stirring the solid material was filtered and washed with water to give 1.44 grams (95%) of desired product, mp. 115°-118° C. The infrared spectrum showed a strong 1770 cm$^{-1}$ lactone carbonyl peak. A solution of the product on silica gel produced a purple color.

EXAMPLES 10-12

According to substantially the same procedure as described in example 9, (1-ethyl-2-methylindol-3-yl)(3-carboxypyridin-2-yl)ketone was reacted with a substantially equimolar amount of substrate reactant B in the presence of acetic anhydride with heating. The reaction product was separated. A solution of each product was used to produce a color on record sheet material coated with a zinc-modified phenolic resin or silton clay. The results are presented in Table IV.

Additional experimeents were performed where a keto acid and a substrate reactant B were mixed with acetic anhydride and heated. The reaction mixture was cooled, treated with dilute ammonium hydroxide and extracted with toluene. In Table V is a listing of the reactant pairs and the respective color produced when the toluene extract of the reaction product was applied to a record sheet material coated with a zinc-modified phenolic resin or silton clay.

TABLE IV

| Example | Substrate Reactant B | Yield | Infrared Spectrum Peak | Melting Point | Color Produced Color | Acid Reactant |
|---|---|---|---|---|---|---|
| 10 | 2-phenylpyrrolo-[2,1-b]benzothiazole | | 1760 cm$^{-1}$ | 143-146° C. | Blue-Green | zinc-modified phenolic resin |
| 11 | 4-ethyl-2-phenyl-4H-pyrrolo[1,2-a]-benzimidazole | 80% | 1775 cm$^{-1}$ | 107-110° C. | Blue | zinc-modified phenolic resin |
| 12 | 2-phenylimidazo[1,2-a]pyridine | | | 150-158° C. | Red-Purple | silton clay |

TABLE V

| Keto Acid | Substrate Reactant B | Color Produced Color | Acid Reactant |
|---|---|---|---|
| (1-ethyl-2-methylindol-3-yl)(3-carboxy-pyridin-2-yl)ketone | 8-methyl-2-phenylimidazo[1,2-a]-pyridine | Purple | zinc-modified phenolic resin |
| (1-ethyl-2-methylindol-3-yl)(3-carboxy- | | | |

TABLE V-continued

| Keto Acid | Substrate Reactant B | Color | Acid Reactant |
|---|---|---|---|
| pyridin-2-yl)ketone | 6-phenylimidazo[2,1-b]thiazole | Red | silton clay |
| (1-ethyl-2-methylindol-3-yl)(3-carboxy-pyridin-2-yl)ketone | 2-(p-methoxyphenyl)imidazo[1,2-a]pyridine | Red | silton clay |
| (1-isopentyl-2-methylindol-3-yl)(3-carboxypyridin-2-yl)ketone | 4-ethyl-2-phenyl-4H-pyrrolo[1,2-a]benzimidazole | Purple | zinc-modified phenolic resin |
| (1-isopentyl-2-methylindol-3-yl)(3-carboxypyridin-2-yl)ketone | 2-(p-methoxyphenyl)imidazo[1,2-a]pyridine | Red | silton clay |
| (1-isopentyl-2-methylindol-3-yl)(3-carboxypyridin-2-yl)ketone | 2-phenylimidazo[1,2-a]pyridine | Red | silton clay |
| (1-isopentyl-2-methylindol-3-yl)(3-carboxypyridin-2-yl)ketone | 6-(p-methoxyphenyl)imidazo[2,1-b]thiazole | Purple | silton clay |
| (1-isopentyl-2-methylindol-3-yl)(3-carboxypyridin-2-yl)ketone | 2-phenylpyrrolo[2,1-b]benzothiazole | Green | zinc-modified phenolic resin |

EXAMPLE 13

Preparation of 5-(4-diethylamino-2-ethoxyphenyl)-5-(8-methyl-2-phenylimidazo[1,2-a]pyridin-3-yl)-5,7-dihydrofuro[3,4-b]pyridin-7-one.

A solution of 1.04 gram of 8-methyl-2-phenylimidazo[1,2-a]pyridine and 1.71 grams of (4-diethylamino-2-ethoxyphenyl)(3-carboxypyridin-2-yl)ketone in 25 ml. of acetic anhydride was heated 1 hour at 55° C. and allowed to stand for 18 hours at room temperature. The reaction solution was poured into a solution of 100 ml. of water and 50 ml. of 58% ammonium hydroxide. After one hour stirring the cream colored solid was removed by filtration and washed with water to give 2.59 grams of product, mp. 128°–132° C. Thin layer chromatography on silica gel showed a predominant blue spot and a minor blue spot. These were isomeric dyes resulting from the isomeric keto-acid mixture used. The infrared spectrum showed a strong carbonyl lactone peak at 1770 cm$^{-1}$. An aliquot was recrystallized from toluene/petroleum ether to give an analytical sample, mp 221°–223° C. A chloroform solution of the product gave a blue color when applied to a record sheet material coated with silton clay.

EXAMPLES 14–25

According to substantially the same procedure as disclosed in Example 13, (4-diethylamino-2-ethoxyphenyl)(3-carboxypyridin-2-yl)ketone was reacted with a substantially equimolar amount of substrate reactant B in the presence of acetic anhydride and with heating. The reaction product was isolated and a solution of each product was used to produce a color on record sheet material coated with a zinc-modified phenolic resin or silton clay or on silica gel. In Table VI are listed the substrate reactants B employed and test results obtained.

Additional experiments were performed where a keto acid and a substrate reactant B were mixed with acetic anhydride and heated. The reaction mixture was cooled, treated with dilute ammonium hydroxide and extracted with toluene. In Table VII is a listing of the reactant pairs and the respective color produced when the toluene extract of the reaction product was applied to a record sheet material coated with a zinc-modified phenolic resin or silton clay or applied to silica gel.

TABLE VI

| Example | Substrate Reactant B | Yield | Infrared Spectrum Peak | Melting Point | Color | Acid Reactant |
|---|---|---|---|---|---|---|
| 14 | 2-phenylimidazo[1,2-a]pyridine | 87% | | 120–128° C. | Blue | silton clay |
| 15 | 6-nitro-2-phenylimidazo[1,2-a]pyridine | | 1770 cm$^{-1}$ | | Blue | silton clay |
| 16 | 2-(p-methoxyphenyl)imidazo[1,2-a]pyridine | 76% | 1760 cm$^{-1}$ | 138–140° C. | Blue | silton clay |
| 17 | 2-(p-dimethylaminophenyl)imidazo[1,2-a]pyridine | | 1775 cm$^{-1}$ | 110–115° C. | Blue | silton clay |
| 18 | 2-phenylimidazo[2,1-a]isoquinoline | | 1770 cm$^{-1}$ | | Purple-Blue | silton clay |
| 19 | 4-methyl-2-phenylpyrrolo[1,2-a]quinoxaline | | 1765 cm$^{-1}$ | | Purple | zinc-modified phenolic resin |
| 20 | 1-ethyl-6-phenylpyrrolo[1,2-a]imidazole | | 1765 cm$^{-1}$ | | Blue | zinc-modified phenolic resin |
| 21 | 4-ethyl-1-methyl-2-phenylpyrrolo[1,2-a]benzimidazole | | 1760 cm$^{-1}$ | 105–110° C. | Blue | zinc-modified phenolic resin |
| 22 | 4-ethyl-2-phenylpyrrolo[1,2-a]benzimidazole | | 1750 cm$^{-1}$ | 128–130° C. | Blue | silton clay |
| 23 | 2-phenylimidazo[1,2-a]pyrimidine | 75% | 1770 cm$^{-1}$ | 122–126° C. | Purple | silton clay |
| 24 | 2-phenylpyrrolo[2,1-b]benzothiazole | | 1760 cm$^{-1}$ | | Green | zinc-modified phenolic resin |
| 25 | 6-(p-methoxyphenyl)imidazo[2,1-b]thiazole | 95% | 1760 cm$^{-1}$ | 145–155° C. | Blue | silton clay |

TABLE VII

| Keto Acid | Substrate Reactant B | Color | Acid Reactant |
|---|---|---|---|
| (4-diethylamino-2-ethoxyphenyl)(3- | | | |

TABLE VII-continued

| Keto Acid | Substrate Reactant B | Color | Acid Reactant |
|---|---|---|---|
| carboxypyridin-2-yl)ketone | 6-phenylimidazo[2,1-b]thiazole | Purple | silton clay |
| (1-methyl-1,2,3,4-tetrahydroquinolin-6-yl)(3-carboxypyridin-2-yl)ketone | 4-ethyl-1-methyl-2-phenyl-4H-pyrrolo-[1,2-a]benzimidazole | Blue | zinc-modified phenolic resin |
| (1-methyl-1,2,3,4-tetrahydroquinolin-6-yl)(3-carboxypyridin-2-yl)ketone | 8-methyl-2-phenylimidazo[1,2-a]-pyridine | Gray | silton clay |
| (1-methyl-1,2,3,4-tetrahydroquinolin-6-yl)(3-carboxypyridin-2-yl)ketone | 2-phenylimidazo[1,2-a]pyridine | Gray-Purple | silton clay |
| (1-methyl-1,2,3,4-tetrahydroquinolin-6-yl)(3-carboxypyridin-2-yl)ketone | 6-(p-methoxyphenyl)imidazo[2,1-b]-thiazole | Purple | zinc-modified phenolic resin |
| (1-methyl-1,2,3,4-tetrahydroquinolin-6-yl)(3-carboxypyridin-2-yl)ketone | 2-phenylpyrrolo[2,1-b]benzothiazole | Green | zinc-modified phenolic resin |
| (1-methyl-1,2,3,4-tetrahydroquinolin-6-yl)(3-carboxypyridin-2-yl)ketone | 4-methyl-2-phenylpyrrolo[1,2-a]-quinoxaline | Purple | silica gel |
| (2,3,6,7-tetrahydro-1H,5H-benzo[ij]-quinolin-9-yl)(3-carboxypyridin-2-yl)-ketone | 2-(p-methoxyphenyl)imidazo[1,2-a]-pyridine | Purple | silton clay |
| (2,3,6,7-tetrahydro-1H,5H-benzo[ij]-quinolin-9-yl)(3-carboxypyridin-2-yl)-ketone | 2-phenyl pyrrolo[2,1-b]benzothiazole | Green | zinc-modified phenolic resin |
| (1-ethyl-2-methylindol-3-yl)(3-carboxyquinolin-2-yl)ketone | 8-methyl-2-phenylimidazo[1,2-a]-pyridine | Purple | silica gel |
| (1-ethyl-2-methylindol-3-yl)(3-carboxyquinolin-2-yl)ketone | 6-phenylimidazo[2,1-b]thiazole | Purple | silica gel |
| (1-ethyl-2-methylindol-3-yl)(3-carboxyquinolin-2-yl)ketone | 2-(p-methoxyphenyl)imidazo[1,2-a]-pyridine | Purple | silica gel |
| (1-ethyl-2-methylindol-3-yl)(3-carboxyquinolin-2-yl)ketone | 2-phenylimidazo[1,2-a]pyridine | Purple | silica gel |
| (1-ethyl-2-methylindol-3-yl)(3-carboxyquinolin-2-yl)ketone | 6-(p-methoxyphenyl)imidazo[2,1-b]-thiazole | Purple | silton clay |
| (1-ethyl-2-methylindol-3-yl)(3-carboxyquinolin-2-yl)ketone | 2-phenylpyrrolo[2,1-b]benzothiazole | Green | silton clay |
| 4-diethylamino-2-ethoxyphenyl)(3-carboxyquinolin-2-yl)ketone | 1-methyl-2-phenyl-4-ethyl-4H-pyrrolo-[1,2-a]benzimidazole | Blue | zinc-modified phenolic resin |
| (1-ethyl-2-methylindol-3-yl)(3-carboxy-quinoxalin-2-yl)ketone | 8-methyl-2-phenylimidazo[1,2-a]-pyridine | Orange | silton clay |
| (1-ethyl-2-methylindol-3-yl)(3-carboxy-quinoxalin-2-yl)ketone | 6-phenylimidazo[2,1-b]thiazole | Red | silton clay |
| (1-ethyl-2-methylindol-3-yl)(3-carboxy-quinoxalin-2-yl)ketone | 2-phenylimidazo[1,2-a]pyridine | Red | silton clay |
| (1-ethyl-2-methylindol-3-yl)(3-carboxy-quinoxalin-2-yl)ketone | 2-(p-methoxyphenyl)imidazo[1,2-a]-pyridine | Red | silton clay |
| (1-ethyl-2-methylindol-3-yl)(3-carboxy-quinoxalin-2-yl)ketone | 6-(p-methoxyphenyl)imidazo[2,1-b]-thiazole | Red | silton clay |
| A mixture of (1-ethyl-2-methylindol-3-yl)(3-carboxy-6-chloroquinoxalin-2-yl)ketone and (1-ethyl-2-methyl-indol-3-yl)(3-carboxy-7-chloroquin-oxalin-2-yl)ketone | 2-phenylimidazo[1,2-a]pyridine | Orange | silton clay |
| A mixture of (1-ethyl-2-methylindol-3-yl)(3-carbozxy-6-chloroquinoxalin-2-yl)ketone and (1-ethyl-2-methyl-indol-3-yl)(3-carboxy-7-chloroquin-oxalin-2-yl)ketone | 2-(p-methoxyphenyl)imidazo[1,2-a]-pyridine | Orange | silton clay |
| A mixture of (1-ethyl-2-methylindol-3-yl)(3-carboxy-6-chloroquinoxalin-2-yl)ketone and (1-ethyl-2-methyl-indol-3-yl)(3-carboxy-7-chloroquin-oxalin-2-yl)ketone | 6-(p-methoxyphenyl)imidazo[2,1-b]-thiazole | Purple | zinc-modified phenolic resin |

EXAMPLE 26

Preparation of 3-(4-diethylamino-2-ethoxyphenyl)-3-(8-methyl-2-phenylimidazo[1,2-a]pyridin-3-yl)furo[3,4-b]quinoxalin-1-one.

A mixture of 3.9 grams of (4-diethylamino-2-ethoxyphenyl)(3-carboxyquinoxalin-2-yl)ketone, 2.1 grams of 8-methyl-2-phenylimidazo[1,2-a]pyridine and 15 ml. of acetic anhydride was heated at 80° C. for 1 hour and poured into a mixture of ice ammonia and toluene. The toluene portion was separated, washed with saturated sodium sulfate solution, filtered through phase separation paper and concentrated. Petroleum ether was added to the concentrate and 2.7 grams of crystalline material was filtered off. This material was recrystallized four times from a mixture of toluene and petroleum ether to yield a final product with a melting point of 135°–136° C. A solution of the product produced a blue color when applied to a record sheet material coated with a zinc-modified phenolic resin or silton clay.

Additional experiments were performed where a keto acid and a substrate reactant B were mixed with acetic anhydride and heated. The reaction mixture was cooled, treated with dilute ammonium hydroxide and extracted with toluene. In Table VIII is a listing of the reactant pairs and the respective color produced when the toluene extract of the reaction product was applied to a record sheet material coated with a silton clay.

TABLE VIII

| Keto Acid | Substrate Reactant B | Color Produced | |
|---|---|---|---|
| | | Color | Acid Reactant |
| (4-diethylamino-2-ethoxyphenyl)(3-carboxyquinoxalin-2-yl)ketone | 6-phenylimidazo[2,1-b]thiazole | Blue | |
| (4-diethylamino-2-ethoxyphenyl)(3-carboxyquinoxalin-2-yl)ketone | 2-(p-methoxyphenyl)imidazo[1,2-a]pyridine | Blue-Green | |
| (4-diethylamino-2-ethoxyphenyl)(3-carboxyquinoxalin-2-yl)ketone | 2-phenylimidazo[1,2-a]pyridine | Green | |
| (4-diethylamino-2-ethoxyphenyl)(3-carboxyquinoxalin-2-yl)ketone | 6-(p-methoxyphenylimidazo[2,1-b]thiazole | Black | |
| (4-diethylamino-2-chlorophenyl)(3-carboxyquinoxalin-2-yl)ketone | 4-ethyl-2-phenyl-4H-pyrrolo[1,2-a]benzimidazole | Green | |

In Table IX, for the chromogenic compounds subjected to elemental analysis, are listed the molecular formula, the calculated analysis based on the molecular formula and the results found on analysis.

TABLE IX

| Ex. | Formula | Calculated Analysis | | | | | | Found on Analysis | | | | | |
|---|---|---|---|---|---|---|---|---|---|---|---|---|---|
| | | C | H | N | O | Cl | S | C | H | N | O | Cl | S |
| 1 | $C_{31}H_{25}N_3O_3S$ | 1.65% | 4.85% | 8.09% | 9.24% | | 6.17% | 1.19% | 4.85% | 8.12% | 9.58% | | 6.50% |
| 6 | $C_{38}H_{37}N_3O_3$ | 78.18% | 6.39% | 7.20% | 8.22% | | | 76.70% | 6.75% | 7.68% | 8.90% | | |
| 7 | $C_{37}H_{34}N_2O_2$ | 82.50 | 6.36% | 5.20% | | | | 82.70% | 6.09% | 5.26% | | | |
| 11 | $C_{34}H_{30}N_4O_2$ | 77.54% | 5.74% | 10.63% | 6.08% | | | 76.20% | 5.49% | 9.64% | 8.59% | | |
| 13 | $C_{33}H_{32}N_4O_3$ | 74.41% | 6.06% | 10.52% | 9.01% | | | 74.38% | 5.98% | 10.50% | 9.10% | | |
| 14 | $C_{32}H_{30}N_4O_3 \cdot H_2O$ | 71.62% | 6.01% | 10.44% | 11.93% | | | 71.50% | 5.54% | 10.77% | 12.11% | | |
| 16 | $C_{33}H_{32}N_4O_4$ | 72.24% | 5.88% | 10.21% | 11.67% | | | 70.46% | 6.04% | 9.78% | 13.65% | | |
| 17 | $C_{34}H_{35}N_5O_3$ | 72.70% | 6.28% | 12.47% | 8.55% | | | 72.60% | 6.61% | 12.06% | 8.50% | | |
| 22 | $C_{37}H_{36}N_4O_2$ | 78.13% | 6.38% | 9.85% | 5.63% | | | 79.64% | 5.90% | 9.26% | 5.30% | | |
| 23 | $C_{31}H_{29}N_5O_3$ | 71.66% | 5.63% | 13.55% | 9.24% | | | 72.70% | 5.92% | 12.80% | 8.77% | | |
| 25 | $C_{31}H_{30}N_4O_4S \cdot H_2O$ | 65.01% | 5.63% | 9.78% | 13.97% | | 5.60% | 64.99% | 5.40% | 9.78% | 14.09% | | 5.72% |
| 26 | $C_{36}H_{35}N_5O_3$ | 74.08% | 5.70% | 12.00 | | | | 73.88% | 5.75% | 11.89% | | | |

PREPARATION OF PRESSURE SENSITIVE COPY PAPER

A 1.7% solution of the compound of Example 1, Example 6, Example 10, Example 24 or Example 26 in a 64:36 weight ratio solvent mixture of ethyldiphenylmethane (U.S. Pat. No. 3,996,405) and saturated hydrocarbon oil (distitllation range: 370°–500° F.) is microencapsulated according to the procedure of Example 17 of U.S. Pat. No. 4,100,103. The resulting microcapsules are mixed with uncooked wheat starch particles and cooked corn starch binder and the mixture is coated on a paper web and dried to produce a pressure sensitive transfer sheet.

The resulting pressure sensitive transfer sheets (CB sheets) are placed face to face with underlying receiving sheets (CF sheets) bearing a coating comprising silton clay as disclosed in U.S. Pat. No. 3,622,364 and 3,753,761. These CB sheet-CF sheet couplets are then subjected to marking pressures which should result in clear, sharp images as described below:

| CB sheet comprising compound of | Image Color |
|---|---|
| Example 1 | Purple |
| Example 6 | Blue |
| Example 10 | Blue - Green |
| Example 24 | Green |
| Example 26 | Blue |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A material selected from the group consisting of (a) a compound represented by the formula:

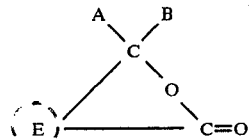

(I)

wherein A is:

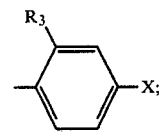

X is:

or morpholino;
$R_1$ and $R_2$ are: hydrogen, alkyl or phenyl;
$R_3$ is: hydrogen or alkoxy;
E is:

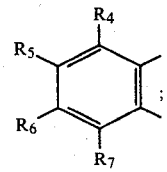

$R_4$, $R_5$, $R_6$ and $R_7$ are: hydrogen, halogen, or dialkylamino;
B is:
Y;
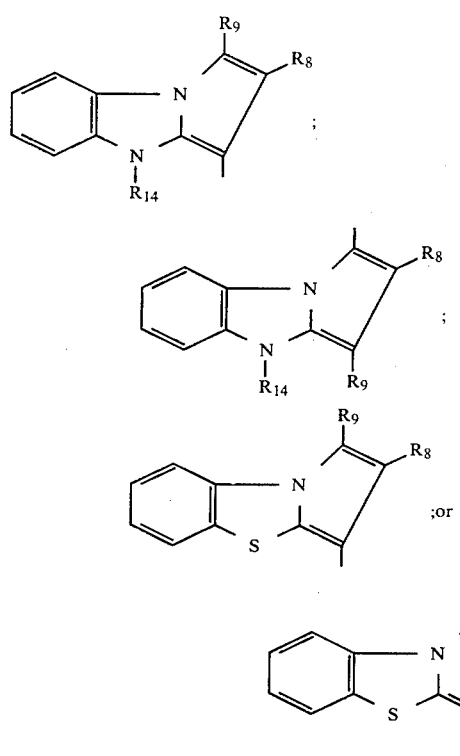
Y is:
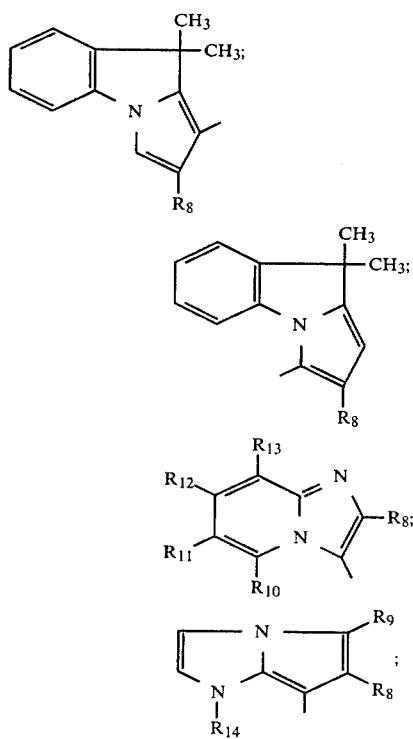
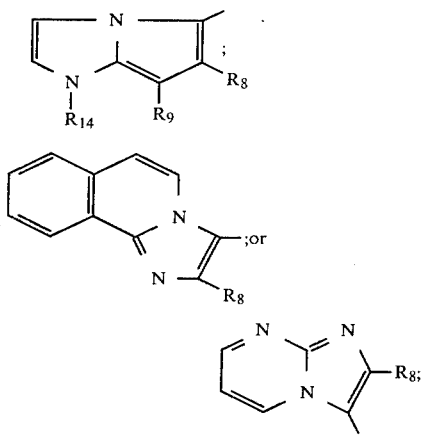
$R_8$ is phenyl, phenyl which is substituted by metoxy or dimethyl/amino, naphthyl or alkyl;
$R_9$ is hydrogen, alkyl or phenyl;
$R_{10}$, $R_{11}$, $R_{12}$ and $R_{13}$ are hydrogen, alkyl or nitro; and
$R_{14}$ is hydrogen or alkyl;
(b) a compound represented by the formula (I) wherein A is:
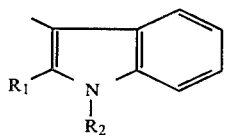
E is:
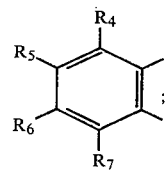
B is:
Y;
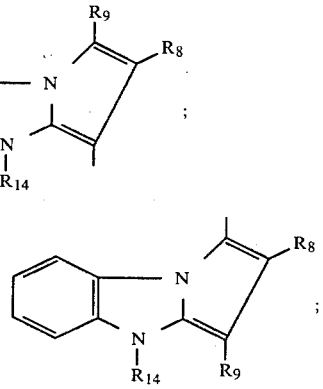

-continued
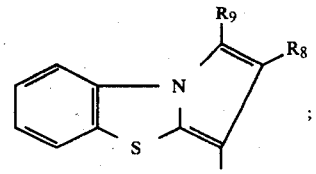
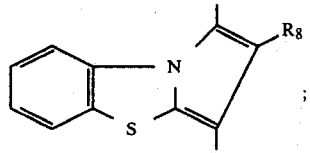
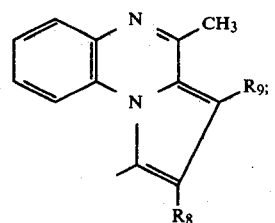
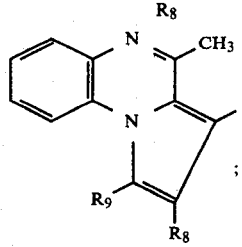
or 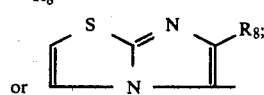
and
R₁ through R₁₄ and Y are as previously defined;
(c) a compound represented by the formula (I) wherein A is:
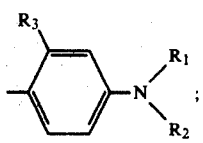
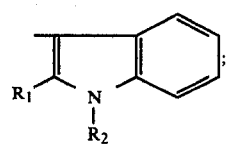
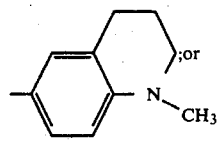
E is:
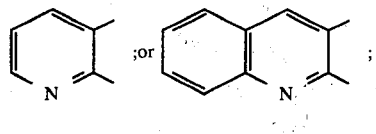
B is:
Y;
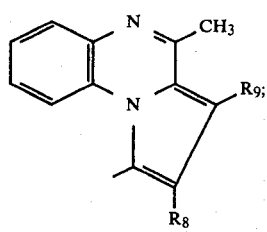
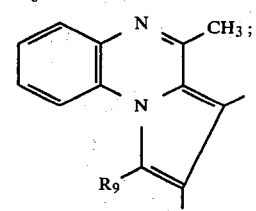
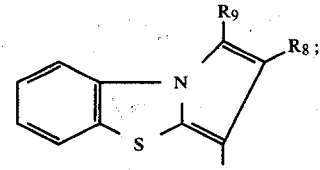
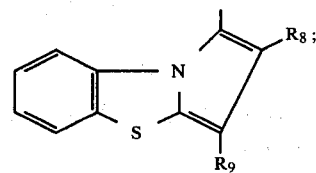
or 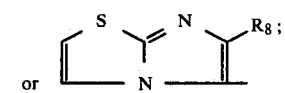
and
R₁ through R₁₄ and Y are as previously defined;
(d) a compound represented by the formula (I) wherein A is:
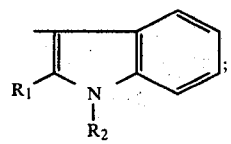
E is:
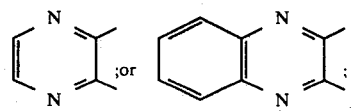
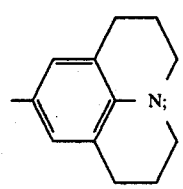
B is:
Y;

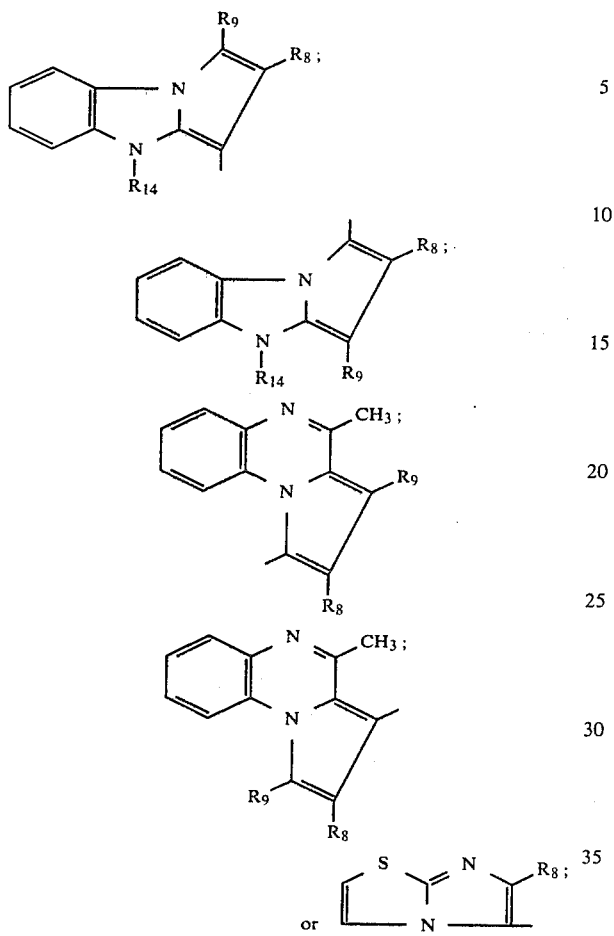
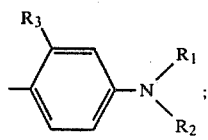
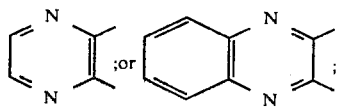
$R_1$ through $R_{14}$ and Y are as previously defined;
(e) a compound represented by the fiormula (I) wherein A is:
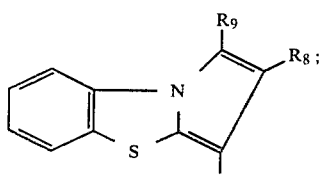
E is:
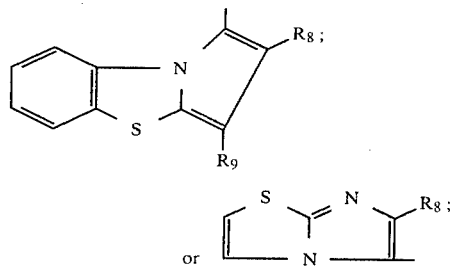
B is:
Y;
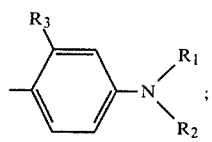
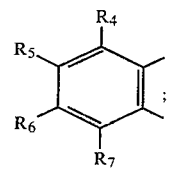
and
$R_1$ through $R_{14}$ and Y are as previously defined.
2. The compound of group (a) of claim 1 wherein A is:
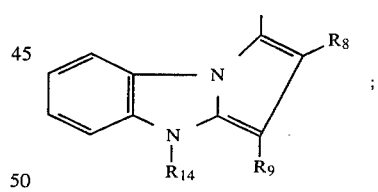
E is:
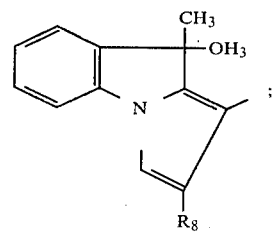
and
B is:
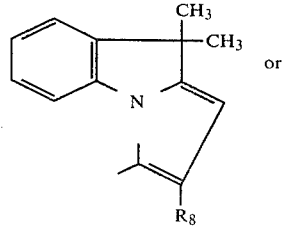

-continued

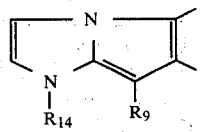

3. The compound of claim 2 wherein:
R$_1$, R$_2$ and R$_{14}$ are ethyl;
R$_3$ is hydrogen or ethoxy;
R$_4$, R$_5$, R$_6$, R$_7$ and R$_9$ are hydrogen; and phenyl which is substituted by methoxy or dimethy/amino
R$_8$ is phenyl, or naphthyl.
4. The compound of claim 3 wherein R$_8$ is phenyl.
5. The compound of claim 2 wherein:
B is:

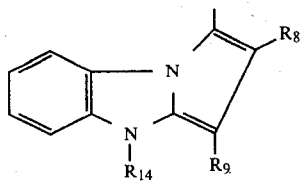

R$_1$, R$_2$ and R$_{14}$ are ethyl;
R$_3$ is ethoxy;
R$_4$, R$_5$, R$_6$, R$_7$ and R$_9$ are hydrogen; and
R$_8$ is phenyl.
6. The compound of group (b) of claim 1 wherein A is:

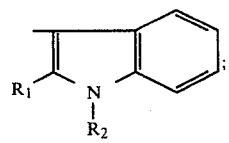

E is:

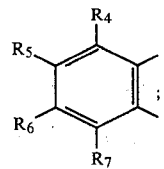

and
B is:

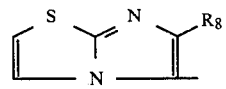

7. The compound of claim 6 wherein:
R$_1$ is methyl;
R$_2$ is ethyl;
R$_4$, R$_5$, R$_6$ and R$_7$ are hydrogen; and
R$_8$ is paramethoxyphenyl.
8. The compound of Group (c) of claim 1 wherein A is:

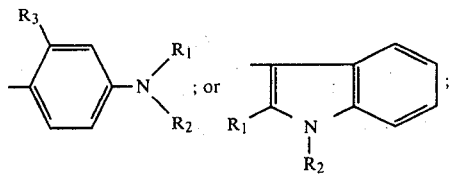

E is:

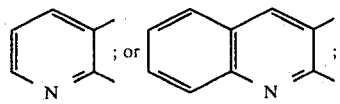

and
B is:

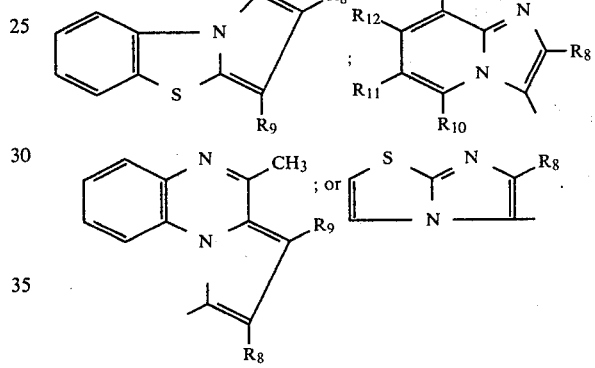

9. The compound of claim 8 wherein:
R$_1$ and R$_2$ are methyl or ethyl;
R$_3$ is ethoxy;
and
R$_8$ is phenyl or phenyl which is substituted by methoxy or dimethyl/amino.
10. The compound of claim 9 wherein R$_8$ is phenyl.
11. The compound of claim 8
wherein A is:

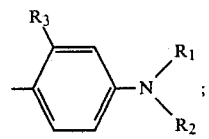

E is:

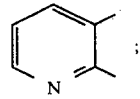

and
B is:

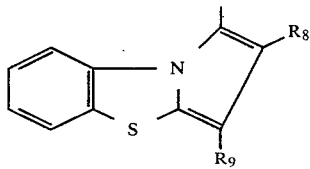

12. The compound of claim 11 wherein:
$R_1$ and $R_2$ are ethyl;
$R_3$ is ethoxy;
$R_8$ is phenyl or phenyl which is substituted by metoxy or dimethy/amino; and
$R_9$ is hydrogen.

13. The compound of claim 12 wherein $R_8$ is phenyl.

14. The compound of Group (d) of claim 1 wherein A is:

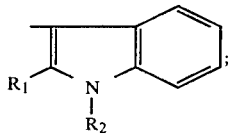

E is:

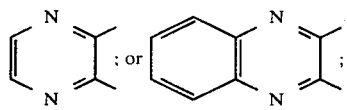

and
B is:

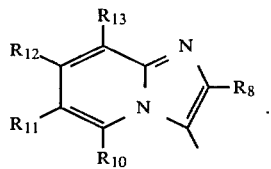

15. The compound of claim 14 wherein: E is:

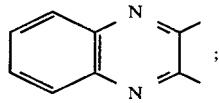

$R_1$ is methyl;
$R_2$ is ethyl;
$R_8$ is phenyl or phenyl which is substituted by methoxy or dimethy/amino; and
$R_{10}$, $R_{11}$, $R_{12}$ and $R_{13}$ are hydrogen or methyl.

16. The compound of claim 15 wherein:
$R_8$ is phenyl; and
$R_{10}$, $R_{11}$, $R_{12}$ and $R_{13}$ are hydrogen.

17. The compound of Group (e) of claim 1 wherein A is:

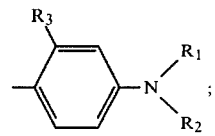

E is:

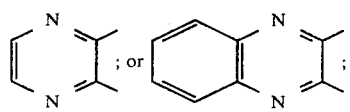

and
B is:

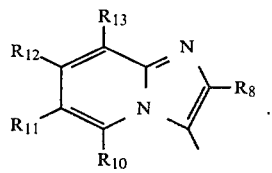

18. The compound of claim 17 wherein:
E is:

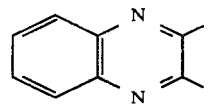

19. The compound of claim 18 wherein:
$R_1$ and $R_2$ are ethyl;
$R_3$ is ethoxy;
$R_8$ is phenyl;
$R_{10}$, $R_{11}$ and $R_{12}$ are hydrogen; and
$R_{13}$ is methyl.

20. The compound of claim 9 wherein; $R_9$ is hydrogen.

21. The compound of claim 9 wherein; $R_{10}$, $R_{11}$, $R_{12}$ and $R_{13}$ are hydrogen.

* * * * *

UNITED STATES PATENT AND TRADEMARK OFFICE
CERTIFICATE OF CORRECTION

PATENT NO. : 4,242,513                           Page 1 of 2

DATED : December 30, 1980

INVENTOR(S) : Troy E. Hoover, et al.

It is certified that error appears in the above-identified patent and that said Letters Patent are hereby corrected as shown below:

Column 24, line 21,
    change "metoxy" to --methoxy--.

Column 24, line 22,
    change "dimethyl/amino" to --dimethylamino--.

Column 27, line 39,
    insert --and--.

Column 27, line 41,
    change "fiormula" to --formula--.

Column 29, line 12,
    after "and" insert --$R_8$ is phenyl,--.

Column 29, line 13,
    change "dimethy/amino" to --dimethylamino--.

Column 29, line 14,
    delete "$R_8$ is phenyl,".

Column 30, line 46,
    change "dimethyl/amino" to --dimethylamino--.

Column 31, line 14,
    change "metoxy" to --methoxy--.

UNITED STATES PATENT AND TRADEMARK OFFICE
CERTIFICATE OF CORRECTION

PATENT NO. : 4,242,513
DATED : December 30, 1980
INVENTOR(S) : Troy E. Hoover, et al.

It is certified that error appears in the above-identified patent and that said Letters Patent are hereby corrected as shown below:

Column 31, line 15,
 change "dimethy/amino" to --dimethylamino--.

Column 32, line 3,
 change "dimeth/amino" to --dimethylamino--.

Signed and Sealed this

Sixteenth Day of June 1981

[SEAL]

Attest:

RENE D. TEGTMEYER

Attesting Officer   Acting Commissioner of Patents and Trademarks

UNITED STATES PATENT AND TRADEMARK OFFICE
CERTIFICATE OF CORRECTION

PATENT NO. : 4,242,513
DATED : December 30, 1980
INVENTOR(S) : Troy E. Hoover, et al.

It is certified that error appears in the above-identified patent and that said Letters Patent are hereby corrected as shown below:

Column 28, line 55, change " 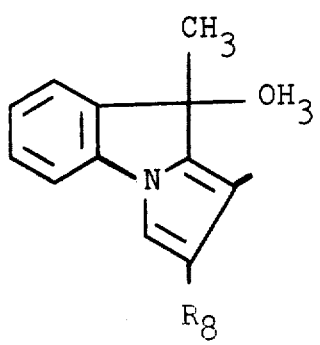 " to -- 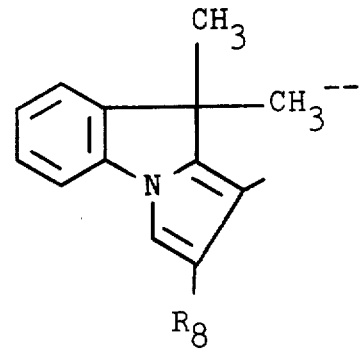 --

Signed and Sealed this

*Twelfth* Day of *January 1982*

[SEAL]

Attest:

Attesting Officer

GERALD J. MOSSINGHOFF

Commissioner of Patents and Trademarks